Dec. 14, 1926.
E. M. PALM
1,611,061
CAN OPENER AND TIN SHEARS
Filed March 26, 1926
Fig. 1,
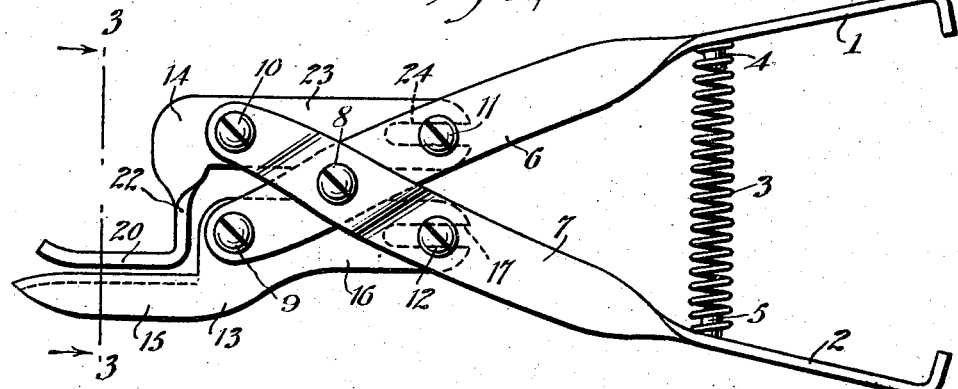
Fig. 2,
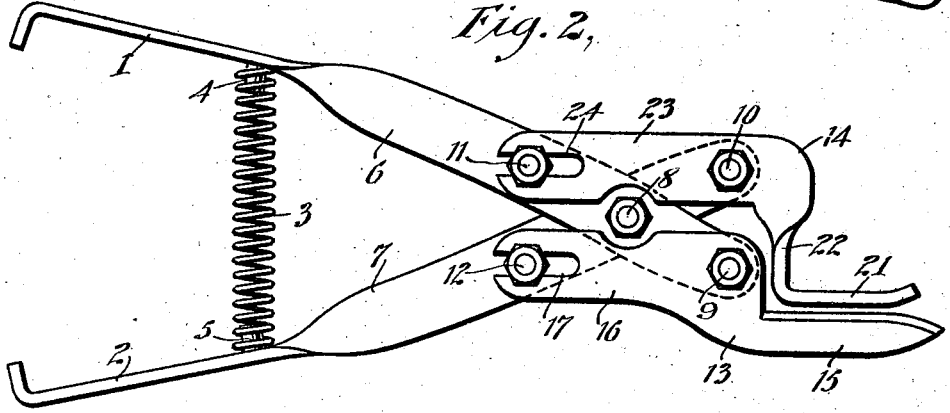
Fig. 3.
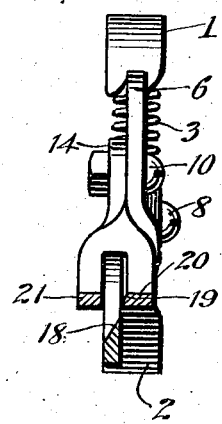
WITNESSES
Edw. Thorpe
A. L. Kitchin
INVENTOR
Eric M. Palm
BY
ATTORNEY Patented Dec. 14, 1926.

1,611,061

UNITED STATES PATENT OFFICE.

ERIC M. PALM, OF BROOKLYN, NEW YORK.

CAN OPENER AND TIN SHEARS.

Application filed March 26, 1926. Serial No. 97,705.

This invention relates to a combined can opener and tin shears and has for an object to present a structure in which an efficient leverage is provided as well as an efficient cutting structure so that comparatively heavy tin may be easily cut by an ordinary person.

Another object of the invention is to provide shears in which the shearing members are so arranged that the tin or other object being cut will be held in substantially accurate cutting position as the cutting edges function.

An additional object is to provide a pair of shears wherein the cutting members are offset from a pivotal point so that the shears may be held substantially parallel to the object being cut.

In the accompanying drawing—

Figure 1 is a side view of a pair of shears disclosing an embodiment of the invention.

Figure 2 is a side view of the shears shown in Figure 1 but looking at the same from the opposite side.

Figure 3 is a sectional view through Figure 1 on line 3—3.

Referring to the accompanying drawing by numerals, 1 and 2 equal the handles which are normally held separated by a spring 3 held in place by suitable posts 4 and 5 connected to the handles 1 and 2. Handle 1 merges into what may be termed a lever 6 and handle 2 merges into a lever 7, said levers being pivotally connected together by a suitable pivotal pin 8 which is shown in the form of a bolt in the drawing. Other pivotal pins are used, namely, pins 9, 10, 11 and 12. These last named pins are shown as bolts though they could be rivets or other journal members. However, preferably the pins 9 and 10 are bolts in order that they may be quickly and easily removed so that the cutting members 13 and 14 may be removed at any time for sharpening or for replacement. The cutting member 13 is provided with a blade 15 and a shank 16, said shank having a slot 17 through which pin 12 extends. The blade 15 is provided with a cutting edge 18 formed by beveling the blade as shown in Figure 3 whereby the cutting portion of the cutting edge 18 will coact with the cutting portion of the cutting edge 19 of the blade 20. The blade 20 is provided with a guide 21 spaced from the cutting edge 19 which acts to hold the sheet metal or other material in proper position for permitting the two cutting edges to cut the same by a shearing action.

By the arrangement of the pins 9 to 12, the cutting edges 18 and 19 are moved directly toward and from each other so that a comparatively long section may be cut at one time or a short section according to the amount of material fed between the cutting members. It will be noted that the cutting member 20 is provided with an offset neck or section 22 merging into the shank 23, which shank is provided with a slit 24 through which pin 11 extends. The blade 15 is also offset as clearly shown in Figure 1 so that the point of cutting is appreciably below the pivotal point 8 when the device is arranged in a vertical plane as shown in the drawing. This permits a flat piece of sheet metal to be readily cut without tilting the shears to any appreciable extent. It also permits the shears to operate in substantially the same manner when cutting the top of a tin can. The members 13 and 14 are preferably made from comparatively high grade steel so that the cutting edges 18 and 19 will function properly and for an appreciable time while the levers 6 and 7 and associated parts may be made from a cheaper grade of metal. Whenever either of the cutting edges 18 and 19 becomes dull, they may be readily sharpened by removing the bolts 9 and 10 and then removing the cutting members and subjecting the cutting members to a suitable sharpening device.

What I claim is:

1. A combined can opener and tin shears comprising a pair of handles, a lever extending from each handle, means for pivotally connecting said levers together near one end, a pair of pivotal members extending from each lever near the ends but on opposite sides of the pivotal point, a pair of cutters, each cutter having a shank, two of said pivotal members pivotally mounting said shanks and the other two guiding the shanks as the levers move, each of said cutters having the portion carrying the cutting edge offset from a line drawn longitudinally of the shears through the pivotal members of the levers.

2. A pair of shears comprising a pair of handles, a pair of levers extending from said handles, means pivotally connecting said levers together near one end, a pin carried by each of the levers on opposite sides of the pivotal connection of the levers, a pair of cutters, each cutter having a shank, two of said pins extending through one shank and two through the opposite shank, each of said shanks having a slot at the end opposite the cutting structures so that as the levers are swung a parallel motion will be given the shanks for moving the cutting structures to and from the cutting position, one of said shanks being offset and provided with a lower cutting blade and the other offset and provided with an upper cutting blade, and a guiding arm arranged parallel to the cutting blades.

ERIC M. PALM.